United States

Fujii

4,153,338

May 8, 1979

[54] WIDE-ANGLE ZOOM LENS SYSTEM

[75] Inventor: Toru Fujii, Hino, Japan

[73] Assignee: Olympus Optical Co., Ltd., Tokyo, Japan

[21] Appl. No.: 806,825

[22] Filed: Jun. 15, 1977

[30] Foreign Application Priority Data

Jun. 17, 1976 [JP] Japan .................. 51/71339

[51] Int. Cl.² .............................................. G02B 15/16
[52] U.S. Cl. .................................................... 350/184
[58] Field of Search ................................ 350/184, 186

[56] References Cited

U.S. PATENT DOCUMENTS

3,848,969  11/1974  Tajima ................................... 350/184

*Primary Examiner*—Conrad J. Clark
*Attorney, Agent, or Firm*—Cushman, Darby & Cushman

[57] ABSTRACT

A wide-angle zoom lens system comprising a front negative lens group and rear positive lens group and arranged to be zoomed by varying the airspace between the front and rear lens groups and to minimize variation of aberrations to be caused at the time of zooming.

5 Claims, 16 Drawing Figures

WIDE-ANGLE ZOOM LENS SYSTEM

BACKGROUND OF THE INVENTION (a) Field of the invention:

The present invention relates to a wide-angle zoom lens system.

(b) Description of the Prior Art:

A zoom lens system comprising a negative lens group and positive lens group for which a mechanical compensating method is adopted is known already. For this kind of retrofocus-type zoom lens systems, it is possible to make the field angle larger compared with the widely known zoom lens systems comprising a lens group constituting an afocal optical system. Moreover, it is possible to make the back focal length large even when the field angle is made large. When, however, it is attempted to make the aperture ratio of the lens system especially large, the effective N.A. of the rear positive lens group in the wide-angle position, where the field angle of the lens system is the largest, becomes considerably different from the effective N.A. in the tele-position, where the field angle of the lens system is the smallest.

Therefore, it becomes very difficult to favourably correct variation of aberrations at the time of zooming. This is the same also in case that it is attempted to make the zooming ratio larger. Besides, for the front negative lens group, aberrations should be kept stable when the entrance pupil moves. For the rear positive lens group, spherical aberration should be kept stable when N.A. changes.

SUMMARY OF THE INVENTION

It is, therefore, a primary object of the present invention to provide a wide-angle zooming lens system for which variation of aberrations at the time of zooming is made as small as possible.

The wide-angle zoom lens system according to the present invention comprises a front negative lens group and rear positive lens group. The front negative lens group comprises a first, second and third lens components and the rear positive lens group comprises a fourth, fifth, sixth, seventh and eighth lens components. In the front negative lens group, the first lens component is a negative lens, the second lens component has negative refractive power and comprises a single lens, negative cemented doublet or two lenses arranged with a very small airspace therebetween, and the third lens component is a positive lens. In the rear positive lens group, the fourth lens component is a positive lens, the fifth lens component is also a positive lens, the sixth lens component is a positive cemented doublet, the seventh lens component is a negative lens, and the eighth lens component is a positive lens.

Moreover, in the zoom lens system according to the present invention, the first lens component in the front negative lens group is arranged so that their both surfaces are roughly concentric in respect to the entrance pupil, the second and third lens components as a whole are arranged to have weak negative power, the surface on the image side of the third lens component is arranged to be concave toward the object side and, by these arrangements, it has become possible to minimize the variation of aberrations to be caused when the entrance pupil moves.

Besides, to arrange a compact zoom lens system, it is necessary to make the telephoto ratio small. Therefore, the principal point of the rear positive lens group should be shifted as far as possible toward the front lens group. For this purpose, strong refractive powers are required for the fourth, fifth and sixth lens components in the rear lens group. As a result, spherical aberration is caused. In the present invention, the sixth lens component is arranged as a cemented doublet in which the cemented surface has negative refractive power so that large negative spherical aberration will not be caused by the fourth, fifth and sixth lens components. At the same time, the seventh lens component is arranged as a lens having comparatively weak diverging effect in order to minimize the positive distortion and positive spherical aberration to be caused by the surface on the image side of the seventh lens component. For the zoom lens system according to the present invention, variation of spherical aberration during zooming is thus limited to a very small value.

In addition to the above, the zoom lens system according to the present invention satisfies the following conditions:

(1) $-2.0 \leq f_F/f_R \leq -1.45$
(2) $1.0 \leq a/f_F \leq 1.5$
(3) $-1.2 \leq b/f_R \leq -1.05$
(4) $0.5 \leq f/f_F \leq 0.95$
(5) $1.0 \leq r_6/f_F \leq 10$
(6) $0.65 \leq f_{456}/f_R \leq 1.0$
(7) $0.45 \leq r_{15}/f_R \leq 1.0$
(8) $0.5 \leq f_8/f_R \leq 1.1$
(9) $50 \leq \nu$ wherein reference symbols $f_F$ and $f_R$ respectively represent focal lengths of the front and rear lens groups, reference symbol a represents the distance from the final surface of the front lens group to the back focal point of the front lens group, reference b represents the distance from the front surface of the rear lens group to the front focal point of the rear lens group (values of a and b are defined to be positive when they are measured in the direction from the object side toward the image side and to be negative when they are measured in the reverse direction), reference symbols $f_1$ and $f_8$ respectively represent focal lengths of the first and eighth lens components, reference symbol $f_{456}$ represents the total focal length of the fourth, fifth and sixth lens components, reference symbol $r_6$ represents the radius of curvature of the surface on the image side of the third lens component, reference symbol $r_{15}$ represents the radius of curvature of the surface on the image side of the seventh lens component, and reference symbol $\nu_1$ represents Abbe's number of the first lens component.

Now, the above-mentioned respective conditions are explained below. The conditions (1), (2) and (3) are established for the purpose of making the zooming ratio large and obtaining a compact zoom lens systems.

If, in the above condition (1), $f_F/f_R$ is made larger than $-1.45$ by keeping the power of the rear positive lens group at the same value and making the power of the front negative lens group stronger, it is possible to make the zooming ratio large. In that case, however, coma to be caused in the front negative lens group increases as the focal length of the lens system as a whole increases and, moreover, spherical aberration in the tele-position will be extremely overcorrected. If $f_F/f_R$ is made larger than $-1.45$ by keeping the power of the front negative lens group at the same value and making the power of the rear positive lens group weaker, the overall length of the lens system becomes large. Moreover, amounts of movement of the front and rear lens groups at the time of zooming become large and it becomes impossible to obtain satisfactory accuracy of zooming.

If, in the condition (1), $f_F/f_R$ is made smaller than $-2.0$ by keeping the power of the rear positive lens group at the same value and making the power of the front negative lens group weaker, the overall length of the lens system in the wide-angle position becomes long when the zooming ratio is kept at the same value. Moreover, the back focal length in the wide-angle position becomes short when the zooming ratio is kept at the same value and, therefore, the lens system becomes unsuitable for single-lens reflex cameras. When, on the contrary, the back focal length is kept long, the zooming ratio becomes small and the lens system becomes unsuitable for practical use. If $f_F/f_R$ is made smaller than $-2.0$ by keeping the power of the front negative lens group at the same value and making the power of the rear positive lens group stronger, the back focal length in the wide-angle position becomes short in the same way as above when the zooming ratio is kept at the same value. Moreover, distortion especially in the wide-angle position inevitably increases due to increase of field angle. Besides, Petzval's sum becomes too small, i.e., becomes a negative value of very large absolute value and, consequently, curvature of field increases especially in the wide-angle position.

As explained in the above, it is not desirable to make $f_F/f_R$ in the condition (1) larger than the upper limit or smaller than the lower limit because the above-mentioned disadvantages will be caused in such case.

The conditions (2) and (3) are established for the purpose of compactly arranging the lens system as a whole on the premise that powers of the front and rear lens groups are arranged as defined by the condition (1). If $a/f_F$ in the condition (2) related to the front negative lens group becomes smaller than 1.0 or if $b/f_R$ in the condition (3) related to the rear positive lens group becomes smaller than $-1.2$, the overall length of the lens system becomes large. If, on the contrary, $a/f_F$ in the condition (2) becomes larger than 1.5 or if $b/f_R$ in the condition (3) becomes larger than $-1.05$, the airspace between the front and rear lens groups become too small so that the front and rear lens groups contact each other or it becomes unavoidable to make the zooming ratio small. Even when $a/f_F$ in the condition (2) is smaller than 1.0, it is possible to arrange a zoom lens system on condition that $b/f_R$ in the condition (3) is larger than $-1.05$. In that case, however, the entrance pupil moves backward. Therefore, it is unavoidable to make the diameter of the front negative lens group large and it becomes impossible to arrange the lens system compactly. In the same way, even when $a/f_F$ in the condition (2) is larger than 1.5, it is possible to arrange a zoom lens system on condition that $b/f_R$ in the condition (3) is smaller than $-1.2$. In that case, the overall length of the lens system can be made short. However, it becomes necessary to shift the principal point of the rear positive lens group extremely forward. As a result, Petzval's sum of the rear positive lens group becomes too small and it becomes impossible to favourably correct curvature of field in the wide-angle position.

The condition (4) is established for the purpose of stabilizing aberrations of the front negative lens group when the position of the entrance pupil is varied. If the focal length $f_1$ of the first lens component becomes larger than the upper limit of the condition (4), coma of lower rays will be undercorrected in the wide-angle position. If $f_1$ becomes smaller than the lower limit of the condition (4), flare caused by coma is overcorrected in the tele-position.

The condition (5) is to minimize distortion in the wide-angle position. If the radius of curvature $r_6$ of the surface on the image side of the positive lens, which is arranged closest to the image side in the front negative lens group, becomes smaller than the lower limit of the condition (5), coma of lower rays will be undercorrected in the tele-position. If $r_6$ becomes larger than the upper limit of the condition (5), distortion in the wide-angle position becomes a negative value of very large absolute value and considerably large barrel distortion will be caused.

The conditions (6), (7) and (8) relate to the rear positive lens group. Out of them, the condition (6) is to define the arrangement of the fourth, fifth and sixth lens components, on the premise that the condition (3) is satisfied, in order to favourably correct coma of offaxial lower rays and spherical aberration. If $f_{456}$ becomes smaller than the lower limit of the condition (6), spherical aberration will be undercorrected in the tele-position and, at the same time, offaxial coma in the wide-angle position will be aggravated. Moreover, Petzval's sum of the lens system as a whole becomes too small, i.e., a negative value of large absolute value, and the difference between curvature of field in the tele-position and curvature of field in the wide-angle position increases. If $f_{456}$ becomes larger than the upper limit of the condition (6), $b/f_R$ in the condition (3) will become smaller than $-1.2$ and it becomes impossible to satisfy the condition (3). Moreover, spherical aberration will be overcorrected in the tele-position.

The condition (7) relates to the surface on the image side of the seventh lens component which is a surface having diverging effect in the rear positive lens group. If the radius of curvature $r_{15}$ of the above surface becomes smaller than the lower limit of the condition (7), positive distortion will be caused, spherical aberration will be overcorrected and coma of offaxial rays, especially of offaxial upper rays, will be overcorrected in the rear lens group. Though positive distortion caused in the rear lens group may be useful for reducing negative distortion of the lens system as a whole in the wide-angle position, it leads to increase of flare caused by coma in the tele-position. If $r_{15}$ becomes larger than the upper limit of the condition (7), the back focal length of the rear positive lens group becomes short and the back focal length of the lens system as a whole becomes insufficient in the tele-position.

The condition (8) relates to the positive lens arranged closest to the image side in the rear positive lens group. If $f_8$ becomes smaller than the lower limit of the condition (8), coma of upper rays will be undercorrected in the wide-angle position. If $f_8$ becomes larger than the upper limit of the condition (8), it becomes difficult to correct lateral chromatic aberration of the lens system favourably by means of the eighth lens component.

The condition (9) is effective for correction of chromatic aberration, especially lateral chromatic aberration, to be caused by the front negative lens group. If $\nu_1$ does not satisfy the condition (9), the difference between lateral chromatic aberration caused by the first lens component in the tele-position and that in the wide-angle position becomes too large and it becomes impossible to correct lateral chromatic aberration favourably by the other lenses arranged in rear of the first lens component.

DETAILED DESCRIPTION OF THE PREFERRED EMBODIMENTS

Preferred embodiments of the wide-angle zoom lens system according to the present invention explained in the above are as shown below.

Embodiment 1

$r_1 = 1.7377$
$d_1 = 0.0486$, $n_1 = 1.6968$, $\nu_1 = 64.15$
$r_2 = 0.679$
$d_2 = 0.3506$
$r_3 = -2.7157$
$d_3 = 0.0539$, $n_2 = 1.757$, $\nu_2 = 55.52$
$r_4 = 2.0895$
$d_4 = 0.0053$
$r_5 = 1.2351$
$d_5 = 0.1775$, $n_3 = 1.66998$, $\nu_3 = 47.87$
$r_6 = -3.8272$
$d_6 = l$ (variable)
$r_7 = 2.2116$
$d_7 = 0.0833$, $n_4 = 1.618$, $\nu_4 = 39.32$
$r_8 = -6.1865$
$d_8 = 0.0042$
$r_9 = 1.0978$
$d_9 = 0.0833$, $n_5 = 1.618$, $\nu_5 = 63.38$
$r_{10} = 6.0994$
$d_{10} = 0.0833$
$r_{11} = 0.7667$
$d_{11} = 0.2083$, $n_6 = 1.618$, $\nu_6 = 63.38$
$r_{12} = -1.5956$
$d_{12} = 0.0417$, $n_7 = 1.62588$, $\nu_7 = 35.7$
$r_{13} = 0.8222$
$d_{13} = 0.1111$
$r_{14} = -2.1127$
$d_{14} = 0.0417$, $n_8 = 1.7495$, $\nu_8 = 35.19$
$r_{15} = 0.6815$
$d_{15} = 0.0722$
$r_{16} = 2.0557$
$d_{16} = 0.0833$, $n_9 = 1.60342$, $\nu_9 = 38.01$
$r_{17} = -0.8465$

| f | back local length | l |
|---|---|---|
| 1 | 1.1939 | 1.29136 |
| 1.3744 | 1.4291 | 0.58547 |
| 1.8889 | 1.7523 | 0.07186 |

Embodiment 2

$r_1 = 1.8793$
$d_1 = 0.05$, $n_1 = 1.6583$, $\nu_1 = 57.33$
$r_2 = 0.6982$
$d_2 = 0.3611$
$r_3 = -5.1364$
$d_3 = 0.0556$, $n_2 = 1.7725$, $\nu_2 = 49.6$
$r_4 = 1.7429$
$d_4 = 0.0053$
$r_5 = 1.1355$
$d_5 = 0.1828$, $n_3 = 1.66998$, $\nu_3 = 39.32$
$r_6 = -8.5441$
$d_6 = l$ (variable)

$r_7 = 2.2816$
$d_7 = 0.0833$, $n_4 = 1.6515$, $\nu_4 = 58.67$
$r_8 = -6.4978$
$d_8 = 0.0042$
$r_9 = 1.0444$
$d_9 = 0.0833$, $n_5 = 1.618$, $\nu_5 = 63.38$
$r_{10} = 5.5636$
$d_{10} = 0.0042$
$r_{11} = 0.7455$
$d_{11} = 0.2083$, $n_6 = 1.58913$, $\nu_6 = 61.11$
$r_{12} = -1.5988$
$d_{12} = 0.0417$, $n_7 = 1.5927$, $\nu_7 = 35.29$
$r_{13} = 0.7992$
$d_{13} = 0.1389$
$r_{14} = -2.2505$
$d_{14} = 0.0417$, $n_8 = 1.7495$, $\nu_8 = 35.19$
$r_{15} = 0.6741$
$d_{15} = 0.0722$
$r_{16} = 2.805$
$d_{16} = 0.0833$, $n_9 = 1.60342$, $\nu_9 = 38.01$
$r_{17} = -0.8461$

| f | back local length | l |
|---|---|---|
| 1 | 1.1916 | 1.38205 |
| 1.38389 | 1.42563 | 0.64136 |
| 1.92547 | 1.7558 | 0.0986 |

Embodiment 3

$r_1 = 1.7267$
$d_1 = 0.0489$, $n_1 = 1.6425$, $\nu_1 = 58.37$
$r_2 = 0.6651$
$d_2 = 0.3047$
$r_3 = -2.4734$
$d_3 = 0.0508$, $n_2 = 1.713$, $\nu_2 = 53.89$
$r_3' = 1.2372$
$d_3' = 0.1111$, $n_2' = 1.62041$, $\nu_2' = 60.27$
$r_4 = 2.7631$
$d_4 = 0.0056$
$r_5 = 1.2479$
$d_5 = 0.1667$, $n_3 = 1.58144$, $\nu_3 = 40.75$
$r_6 = -3.7532$
$d_6 = l$ (variable)
$r_7 = 2.1897$
$d_7 = 0.0833$, $n_4 = 1.618$, $\nu_4 = 63.38$
$r_8 = -5.2499$
$d_8 = 0.0042$
$r_9 = 1.1168$
$d_9 = 0.0833$, $n_5 = 1.618$, $\nu_5 = 63.38$
$r_{10} = 6.7112$
$d_{10} = 0.0833$
$r_{11} = 0.7705$
$d_{11} = 0.2083$, $n_6 = 1.618$, $\nu_6 = 63.38$
$r_{12} = -1.5946$
$d_{12} = 0.0417$, $n_7 = 1.64769$, $\nu_7 = 33.8$
$r_{13} = 0.815$
$d_{13} = 0.1111$
$r_{14} = -2.0153$
$d_{14} = 0.0417$, $n_8 = 1.7495$, $\nu_8 = 35.19$
$r_{15} = 0.7062$
$d_{15} = 0.0722$
$r_{16} = 2.3254$
$d_{16} = 0.0833$, $n_9 = 1.61659$, $\nu_9 = 36.63$
$r_{17} = -0.8274$

| f | back focal length | l |
|---|---|---|
| 1 | 1.1926 | 1.23364 |
| 1.3744 | 1.42775 | 0.52775 |
| 1.889 | 1.75094 | 0.01414 |

Embodiment 4

$r_1 = 1.6037$
$d_1 = 0.0489$, $n_1 = 1.64$, $\nu_1 = 60.09$
$r_2 = 0.6846$
$d_2 = 0.3047$
$r_3 = -2.6055$
$d_3 = 0.0508$, $n_2 = 1.713$, $\nu_2 = 53.89$
$r_3' = 1.23024$
$d_3' = 0.0131$
$r_3'' = 1.2397$

-continued

| | | | |
|---|---|---|---|
| $r_4 = 2.7442$ | $d_3'' = 0.1389$ | $n_2' = 1.56873$ | $v_2' = 63.16$ |
| | $d_4 = 0.0056$ | | |
| $r_5 = 1.3295$ | | | |
| | $d_5 = 0.1389$ | $n_3 = 1.57309$ | $v_3 = 42.57$ |
| $r_6 = -4.0628$ | | | |
| | $d_6 = 1$ (variable) | | |
| $r_7 = 2.2115$ | | | |
| | $d_7 = 0.0833$ | $n_4 = 1.618$ | $v_4 = 63.38$ |
| $r_8 = -5.2482$ | | | |
| | $d_8 = 0.0042$ | | |
| $r_9 = 1.1218$ | | | |
| | $d_9 = 0.0833$ | $n_5 = 1.618$ | $v_5 = 63.38$ |
| $r_{10} = 6.4679$ | | | |
| | $d_{10} = 0.0833$ | | |
| $r_{11} = 0.7671$ | | | |
| | $d_{11} = 0.2083$ | $n_6 = 1.618$ | $v_6 = 63.38$ |
| $r_{12} = -1.5886$ | | | |
| | $d_{12} = 0.0417$ | $n_7 = 1.62588$ | $v_7 = 35.7$ |
| $r_{13} = 0.8184$ | | | |
| | $d_{13} = 0.1111$ | | |
| $r_{14} = -1.9825$ | | | |
| | $d_{14} = 0.0417$ | $n_8 = 1.7495$ | $v_8 = 35.19$ |
| $r_{15} = 0.6921$ | | | |
| | $d_{15} = 0.0722$ | | |
| $r_{16} = 2.3291$ | | | |
| | $d_{16} = 0.0833$ | $n_9 = 1.60342$ | $v_9 = 38.01$ |
| $r_{17} = -0.8231$ | | | |

| f | back focal length | 1 |
|---|---|---|
| 1 | 1.1884 | 1.24264 |
| 1.3743 | 1.4235 | 0.53675 |
| 1.8889 | 1.7467 | 0.02314 |

In the above embodiments, reference symbols $r_1, r_2 \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $v_1, v_2, \ldots$ respectively represent Abbe's numbers of respective lenses, and reference symbol f represents the focal length of the lens system as a whole.

Figure 1:
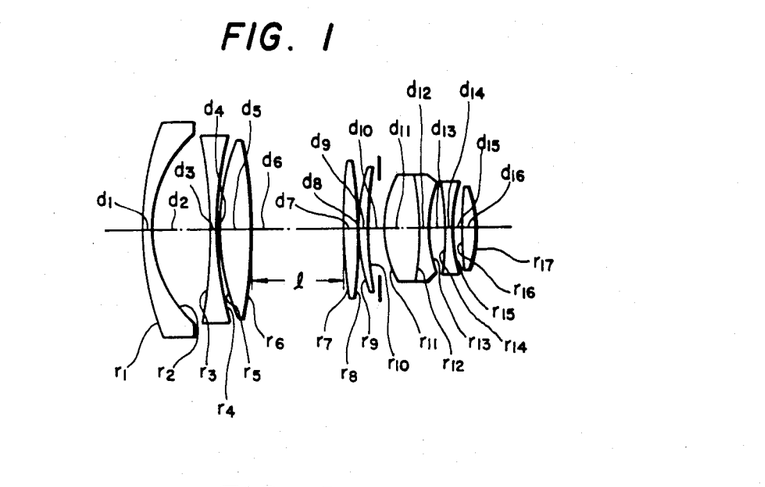
FIG. 1 shows a sectional view of Embodiment 1 of the zoom lens system according to the present invention.
Figure 2:
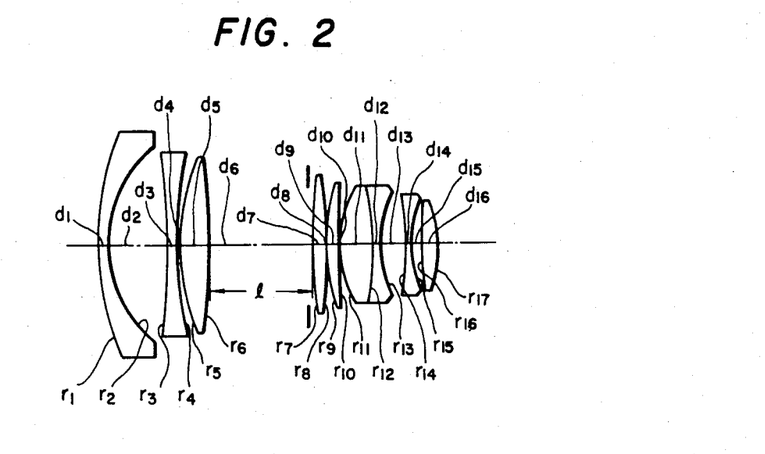
FIG. 2 shows a sectional view of Embodiment 2.
Figure 3:
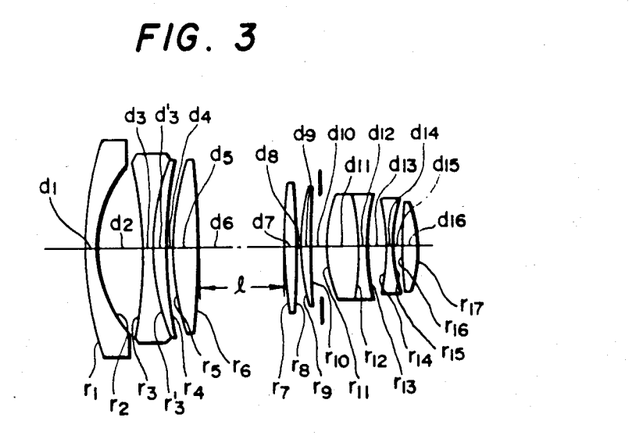
FIG. 3 shows a sectional view of Embodiment 3.
Figure 4:
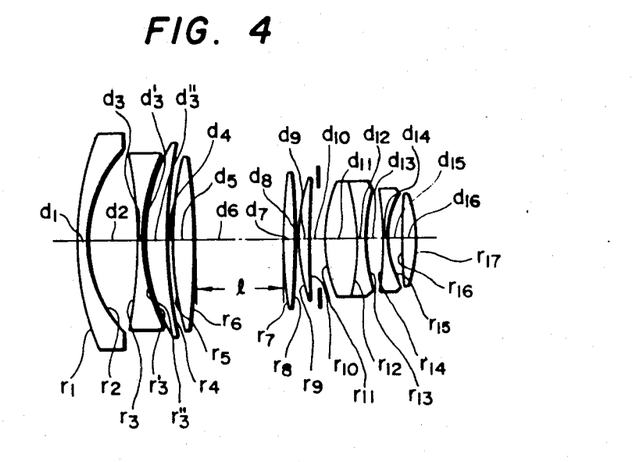
FIG. 4 shows a sectional view of Embodiment 4.
Figure 5A:
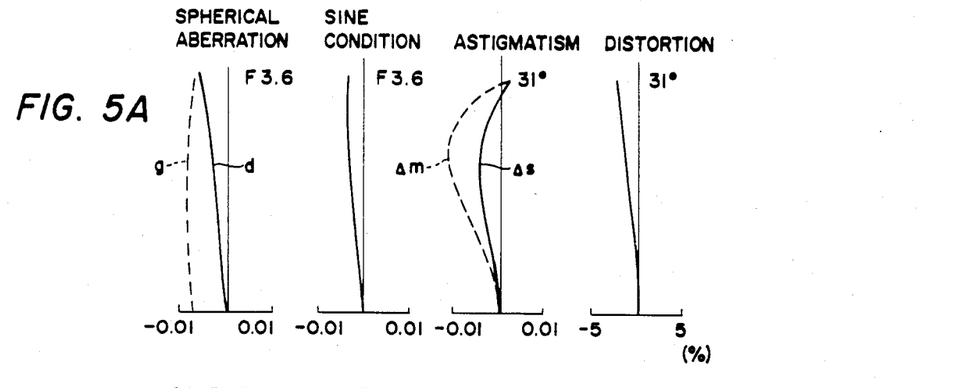
FIGS. 5A, 5B and 5C respectively show graphs illustrating aberration curves of Embodiment 1.
Figure 5B:
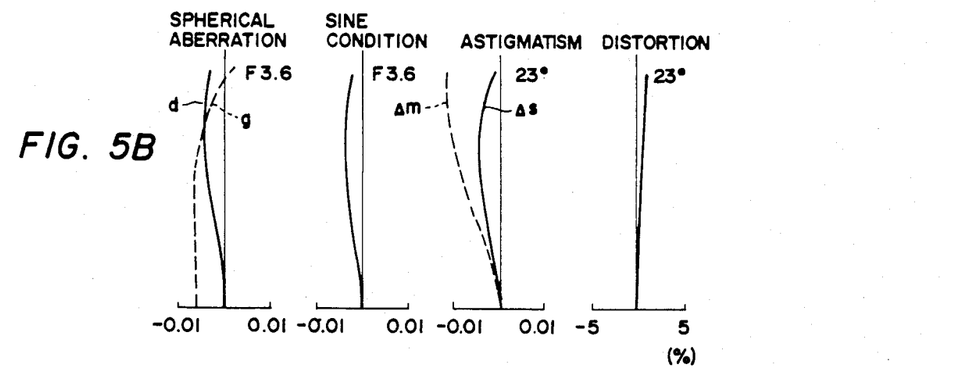
Figure 5C:
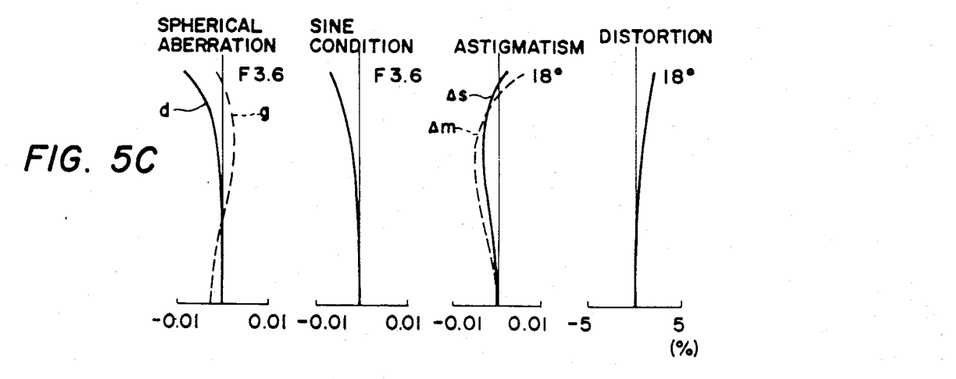
Figure 6A:
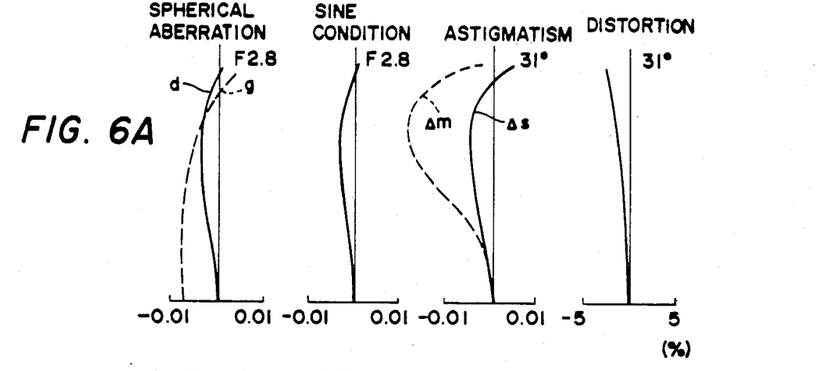
FIGS. 6A, 6B, and 6C respectively show graphs illustrating aberration curves of Embodiment 2.
Figure 6B:
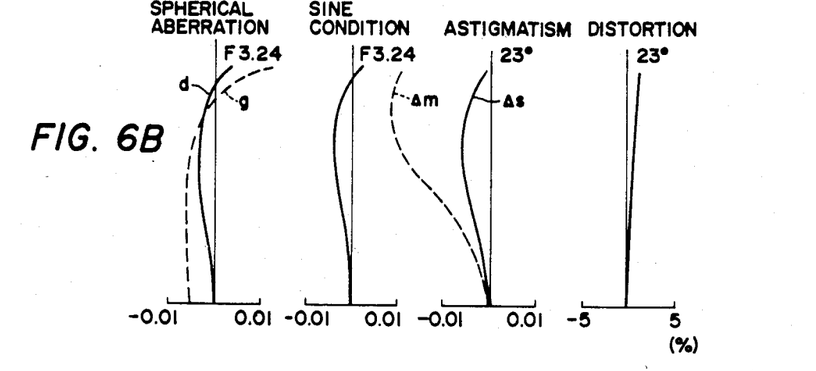
Figure 6C:
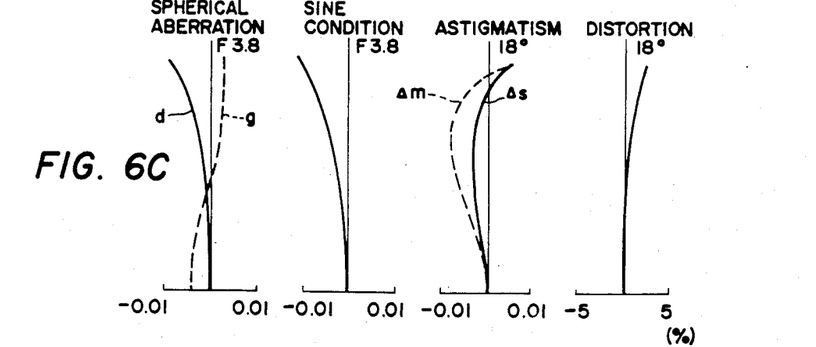
Figure 7A:
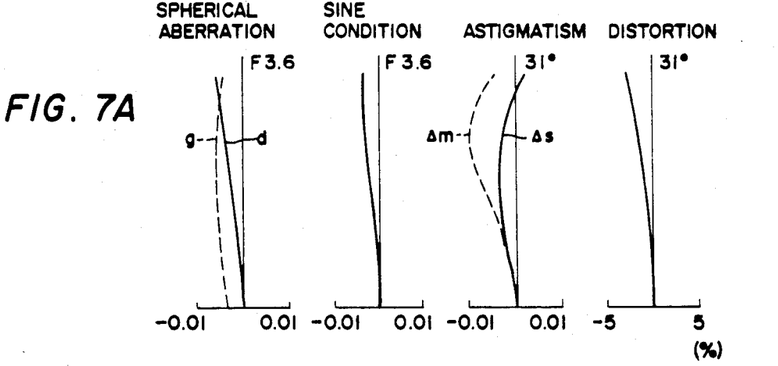
FIGS. 7A, 7B and 7C respectively show graphs illustrating aberration curves of Embodiment 3.
Figure 7B:
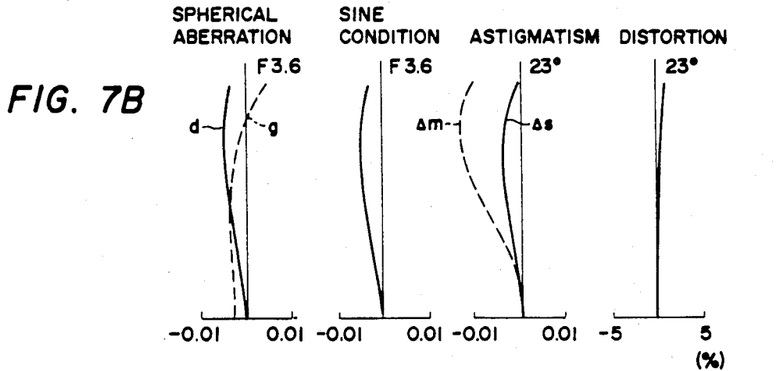
Figure 7C:
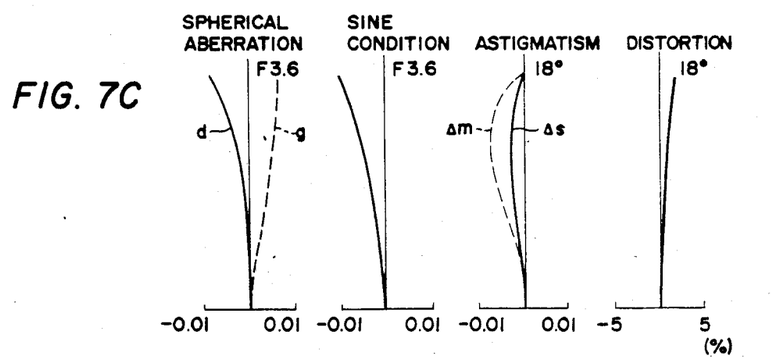
Figure 8A:
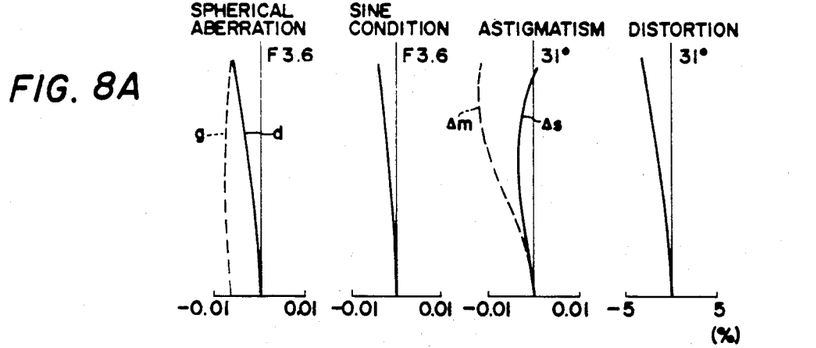
FIGS. 8A, 8B and 8C respectively show graphs illustrating aberration curves of Embodiment 4.
Figure 8B:
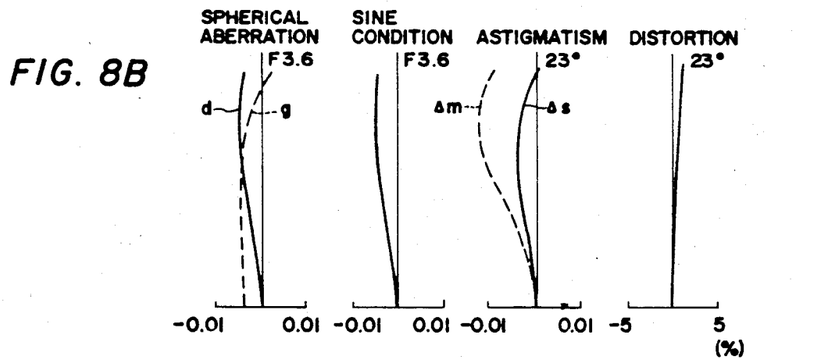
Figure 8C:
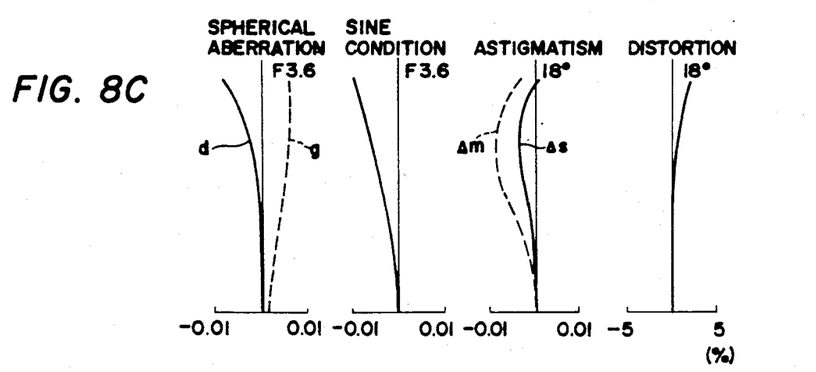

Numerical values in the above embodiments are given on the basis that the focal length of the lens system as a whole in the wide-angle position is 1. Embodiment 1 has lens configuration as shown in FIG. 1 and Embodiment 2 has lens configuration as shown in FIG. 2. In these embodiments, the second lens component is arranged as a negative single lens. Embodiment 3 has lens configuration as shown in FIG. 3 and its second lens component is arranged as a negative cemented doublet. Embodiment 4 has lens configuration as shown in FIG. 4. In Embodiment 4, the second lens component consists of two lenses, which are separated from each other, and is arranged to have negative refractive power as a whole.

Abberration curves of the above-mentioned respective embodiments are shown in FIGS. 5A, 5B, 5C, 6A, 6B, 6C, 7A, 7B, 7C, 8A, 8B and 8C. Out of these figures, FIGS. 5A, 6A, 7A and 8A respectively show aberration curves in the wide-angle position, FIGS. 5B, 6B, 7B and 8B respectively show aberration curves in the standard position and FIGS. 5C, 6C, 7C and 8C respectively show aberration curves in the tele-position.

Besides, values of $f_F$, $f_R$, a, b, $f_1$, $f_{456}$ and $f_8$ in the above embodiments are respectively as shown below.

| | Embodiment 1 | Embodiment 2 | Embodiment 3 | Embodiment 4 |
|---|---|---|---|---|
| $f_F$ | −2.031 | −2.093 | −2.031 | −2.125 |
| $f_R$ | 1.276 | 1.276 | 1.276 | 1.276 |
| a | −2.675 | −2.708 | −2.730 | −2.841 |
| b | −1.375 | −1.420 | −1.373 | −1.385 |
| $f_1$ | −1.630 | −1.716 | −1.715 | −1.906 |
| $f_{456}$ | 0.950 | 0.915 | 0.962 | 0.941 |
| $f_8$ | 1.005 | 1.087 | 0.9998 | 1.018 |

I claim:
1. A wide-angle zoom lens system comprising a front negative lens group and rear positive lens group, said front negative lens group comprising a first, second and third lens components, said rear positive lens group comprising a fourth, fifth, sixth, seventh and eighth lens components, said first lens component being a negative lens, said second lens component having negative refractive power, said third lens component being a positive lens, said fourth lens component being a positive lens, said fifth lens component being a positive lens, said sixth lens component being a positive cemented doublet, said seventh lens component being a negative lens, said eighth lens component being a positive lens, said wide-angle zoom lens system being arranged to be zoomed by varying the airspace between said front negative lens group and said rear positive lens group and to satisfy the following conditions:

(1) $-2.0 \leq f_F/f_R \leq -1.45$
(2) $1.0 \leq a/f_F \leq 1.5$
(3) $-1.2 \leq b/f_R \leq -1.05$
(4) $0.5 \leq f_1/f_F \leq 0.95$
(5) $1.0 \leq r_6/f_F \leq 10$
(6) $0.65 \leq f_{456}/f_R \leq 1.0$
(7) $0.45 \leq r_{15}/f_R \leq 1.0$
(8) $0.5 \leq f_8/f_R \leq 1.1$
(9) $50 \leq v_1$ wherein reference symbol $f_F$ represents the focal length of the front lens group, reference symbol $f_R$ represents the focal length of the rear lens group, reference symbol $f_1$ represents the focal length of the first lens component, reference symbol $f_{456}$ represents the total focal length of the fourth, fifth and sixth lens components, reference symbol $f_8$ represents the focal length of the eighth lens component, reference symbol a represents the distance from the final surface of the front lens group to the back focal point of the front lens group, reference symbol b represents the distance from the front surface of the rear lens group to the front focal point of the rear lens group, reference symbol $r_6$ represents the radius of curvature of the surface on the image side of the third lens component, reference symbol $r_{15}$ represent the radius of curvature of the surface on the image side of the seventh lens component, and reference symbol $v_1$ represents Abbe's number of the first lens component.

2. A wide-angle zoom lens system according to claim 1, in which said second lens component is a negative lens and said wide-angle zoom lens system has the following numerical data:

| | | | |
|---|---|---|---|
| $r_1 = 1.7377$ | | | |
| | $d_1 = 0.0486$ | $n_1 = 1.6968$ | $v_1 = 64.15$ |
| $r_2 = 0.679$ | | | |
| | $d_2 = 0.3506$ | | |
| $r_3 = -2.7157$ | | | |
| | $d_3 = 0.0539$ | $n_2 = 1.757$ | $v_2 = 55.52$ |
| $r_4 = 2.0895$ | | | |
| | $d_4 = 0.0053$ | | |
| $r_5 = 1.2351$ | | | |
| | $d_5 = 0.1775$ | $n_3 = 1.66998$ | $v_3 = 47.87$ |
| $r_6 = -3.8272$ | | | |
| | $d_6 = 1$ (variable) | | |
| $r_7 = 2.2116$ | | | |
| | $d_7 = 0.0833$ | $n_4 = 1.618$ | $v_4 = 39.32$ |

-continued

| | | | |
|---|---|---|---|
| $r_8 = -6.1865$ | | | |
| | $d_8 = 0.0042$ | | |
| $r_9 = 1.0978$ | | | |
| | $d_9 = 0.0833$ | $n_5 = 1.618$ | $\nu_5 = 63.38$ |
| $r_{10} = 6.0994$ | | | |
| | $d_{10} = 0.0833$ | | |
| $r_{11} = 0.7667$ | | | |
| | $d_{11} = 0.2083$ | $n_6 = 1.618$ | $\nu_6 = 63.38$ |
| $r_{12} = -1.5956$ | | | |
| | $d_{12} = 0.0417$ | $n_7 = 1.62588$ | $\nu_7 = 35.7$ |
| $r_{13} = 0.8222$ | | | |
| | $d_{13} = 0.1111$ | | |
| $r_{14} = -2.1127$ | | | |
| | $d_{14} = 0.0417$ | $n_8 = 1.7495$ | $\nu_8 = 35.19$ |
| $r_{15} = 0.6815$ | | | |
| | $d_{15} = 0.0722$ | | |
| $r_{16} = 2.0557$ | | | |
| | $d_{16} = 0.0833$ | $n_9 = 1.60342$ | $\nu_9 = 38.01$ |
| $r_{17} = -0.8465$ | | | |

| f | back focal length | l |
|---|---|---|
| 1 | 1.1939 | 1.29136 |
| 1.3744 | 1.4291 | 0.58547 |
| 1.8889 | 1.7523 | 0.07186 | wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol f represents the focal length of the lens system as a whole.

3. A wide-angle zoom lens system according to claim 1, in which said second lens component is a negative lens and said wide-angle zoom lens system has the following numerical data:

| | | | |
|---|---|---|---|
| $r_1 = 1.8793$ | | | |
| | $d_1 = 0.05$ | $n_1 = 1.6583$ | $\nu_1 = 57.33$ |
| $r_2 = 0.6982$ | | | |
| | $d_2 = 0.3611$ | | |
| $r_3 = -5.1364$ | | | |
| | $d_3 = 0.0556$ | $n_2 = 1.7725$ | $\nu_2 = 49.6$ |
| $r_4 = 1.7429$ | | | |
| | $d_4 = 0.0053$ | | |
| $r_5 = 1.1355$ | | | |
| | $d_5 = 0.1828$ | $n_3 = 1.66998$ | $\nu_3 = 39.32$ |
| $r_6 = -8.5441$ | | | |
| | $d_6 = l$ (variable) | | |
| $r_7 = 2.2816$ | | | |
| | $d_7 = 0.0833$ | $n_4 = 1.6516$ | $\nu_4 = 58.67$ |
| $r_8 = -6.4978$ | | | |
| | $d_8 = 0.0042$ | | |
| $r_9 = 1.0444$ | | | |
| | $d_9 = 0.0833$ | $n_5 = 1.618$ | $\nu_5 = 63.38$ |
| $r_{10} = 5.5636$ | | | |
| | $d_{10} = 0.0042$ | | |
| $r_{11} = 0.7455$ | | | |
| | $d_{11} = 0.2083$ | $n_6 = 1.58913$ | $\nu_6 = 61.11$ |
| $r_{12} = -1.5988$ | | | |
| | $d_{12} = 0.0417$ | $n_7 = 1.5927$ | $\nu_7 = 35.29$ |
| $r_{13} = 0.7992$ | | | |
| | $d_{13} = 0.1389$ | | |
| $r_{14} = -2.2505$ | | | |
| | $d_{14} = 0.0417$ | $n_8 = 1.7495$ | $\nu_8 = 35.19$ |
| $r_{15} = 0.6741$ | | | |
| | $d_{15} = 0.0722$ | | |
| $r_{16} = 2.805$ | | | |
| | $d_{16} = 0.0833$ | $n_9 = 1.60342$ | $\nu_9 = 38.01$ |
| $r_{17} = -0.8461$ | | | |

| f | back focal length | l |
|---|---|---|
| 1 | 1.1916 | 1.38205 |
| 1.38389 | 1.42563 | 0.64136 |
| 1.92547 | 1.7558 | 0.0986 | wherein reference symbols $r_1, r_{2m} \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol f represents the focal length of the lens system as a whole.

4. A wide-angle zoom lens system according to claim 1, in which said second lens component is a negative cemented doublet and said wide-angle zoom lens system has the following numerical data:

| | | | |
|---|---|---|---|
| $r_1 = 1.7267$ | | | |
| | $d_1 = 0.0489$ | $n_1 = 1.6425$ | $\nu_1 = 58.37$ |
| $r_2 = 0.6651$ | | | |
| | $d_2 = 0.3047$ | | |
| $r_3 = -2.4734$ | | | |
| | $d_3 = 0.0508$ | $n_2 = 1.713$ | $\nu_2 = 53.89$ |
| $r_3' = 1.2372$ | | | |
| | $d'_3 = 0.1111$ | $n_2' = 1.62041$ | $\nu_2' = 60.27$ |
| $r_4 = 2.7631$ | | | |
| | $d_4 = 0.0056$ | | |
| $r_5 = 1.2479$ | | | |
| | $d_5 = 0.1667$ | $n_3 = 1.58144$ | $\nu_3 = 40.75$ |
| $r_6 = -3.7532$ | | | |
| | $d_6 = l$ (variable) | | |
| $r_7 = 2.1897$ | | | |
| | $d_7 = 0.0833$ | $n_4 = 1.618$ | $\nu_4 = 63.38$ |
| $r_8 = -5.2499$ | | | |
| | $d_8 = 0.0042$ | | |
| $r_9 = 1.1168$ | | | |
| | $d_9 = 0.0833$ | $n_5 = 1.618$ | $\nu_5 = 63.38$ |
| $r_{10} = 6.7112$ | | | |
| | $d_{10} = 0.0833$ | | |
| $r_{11} = 0.7705$ | | | |
| | $d_{11} = 0.2083$ | $n_6 = 1.618$ | $\nu_6 = 63.38$ |
| $r_{12} = -1.5946$ | | | |
| | $d_{12} = 0.0417$ | $n_7 = 1.64769$ | $\nu_7 = 33.8$ |
| $r_{13} = 0.815$ | | | |
| | $d_{13} = 0.1111$ | | |
| $r_{14} = -2.0153$ | | | |
| | $d_{14} = 0.0417$ | $n_8 = 1.7495$ | $\nu_8 = 35.19$ |
| $r_{15} = 0.7062$ | | | |
| | $d_{15} = 0.0722$ | | |
| $r_{16} = 2.3254$ | | | |
| | $d_{16} = 0.0833$ | $n_9 = 1.61659$ | $\nu_9 = 36.63$ |
| $r_{17} = 0.8274$ | | | |

| f | back focal length | l |
|---|---|---|
| 1 | 1.1926 | 1.23364 |
| 1.3744 | 1.42775 | 0.52775 |
| 1.889 | 1.75094 | 0.01414 | wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol f represents the focal length of the lens system as a whole.

5. A wide-angle zoom lens system according to claim 1, in which said second lens components consists of a negative lens and positive meniscus lens arranged with a very small airspace therebetween and said wide-angle zoom lens system has the following numerical data:

| | | | |
|---|---|---|---|
| $r_1 = 1.6037$ | | | |
| | $d_1 = 0.0489$ | $n_1 = 1.64$ | $\nu_1 = 60.09$ |
| $r_2 = 0.6846$ | | | |
| | $d_2 = 0.3047$ | | |
| $r_3 = -2.6055$ | | | |
| | $d_3 = 0.0508$ | $n_2 = 1.713$ | $\nu_2 = 53.89$ |
| $r_3' = 1.23024$ | | | |
| | $d_3' = 0.0131$ | | |
| $r_3'' = 1.2397$ | | | |
| | $d_3'' = 0.1389$ | $n_2' = 1.56873$ | $\nu_2' = 63.16$ |
| $r_4 = 2.7442$ | | | |
| | $d_4 = 0.0056$ | | |
| $r_5 = 1.3295$ | | | |
| | $d_5 = 0.1389$ | $n_3 = 1.57309$ | $\nu_3 = 42.57$ |
| $r_6 = -4.0628$ | | | |
| | $d_6 = l$ (variable) | | |
| $r_7 = 2.2115$ | | | |
| | $d_7 = 0.0833$ | $n_4 = 1.618$ | $\nu_4 = 63.38$ |
| $r_8 = -5.2482$ | | | |
| | $d_8 = 0.0042$ | | |
| $r_9 = 1.1218$ | | | |
| | $d_9 = 0.0833$ | $n_5 = 1.618$ | $\nu_5 = 63.38$ |
| $r_{10} = 6.4679$ | | | |
| | $d_{10} = 0.0833$ | | |
| $r_{11} = 0.7671$ | | | |
| | $d_{11} = 0.2083$ | $n_6 = 1.618$ | $\nu_6 = 63.38$ |
| $r_{12} = -1.5886$ | | | |

-continued

| | | | |
|---|---|---|---|
| | $d_{12} = 0.0417$ | $n_7 = 1.62588$ | $\nu_7 = 35.7$ |
| $r_{13} = 0.8184$ | | | |
| | $d_{13} = 0.1111$ | | |
| $r_{14} = -1.9825$ | | | |
| | $d_{14} = 0.0417$ | $n_8 = 1.7495$ | $\nu_8 = 35.19$ |
| $r_{15} = 0.6921$ | | | |
| | $d_{15} = 0.0722$ | | |
| $r_{16} = 2.3291$ | | | |
| | $d_{16} = 0.0833$ | $n_9 = 1.60342$ | $\nu_9 = 38.01$ |
| $r_{17} = -0.8231$ | | | |

| f | back focal length | l |
|---|---|---|
| 1 | 1.1884 | 1.24264 |
| 1.3743 | 1.4235 | 0.53675 |
| 1.8889 | 1.7467 | 0.02314 | wherein reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol f represents the focal length of the lens system as a whole.

* * * * *